April 7, 1953   W. H. SASS   2,634,010
BOAT SUPPORTING BRACKET
Filed Dec. 6, 1949   2 SHEETS—SHEET 1
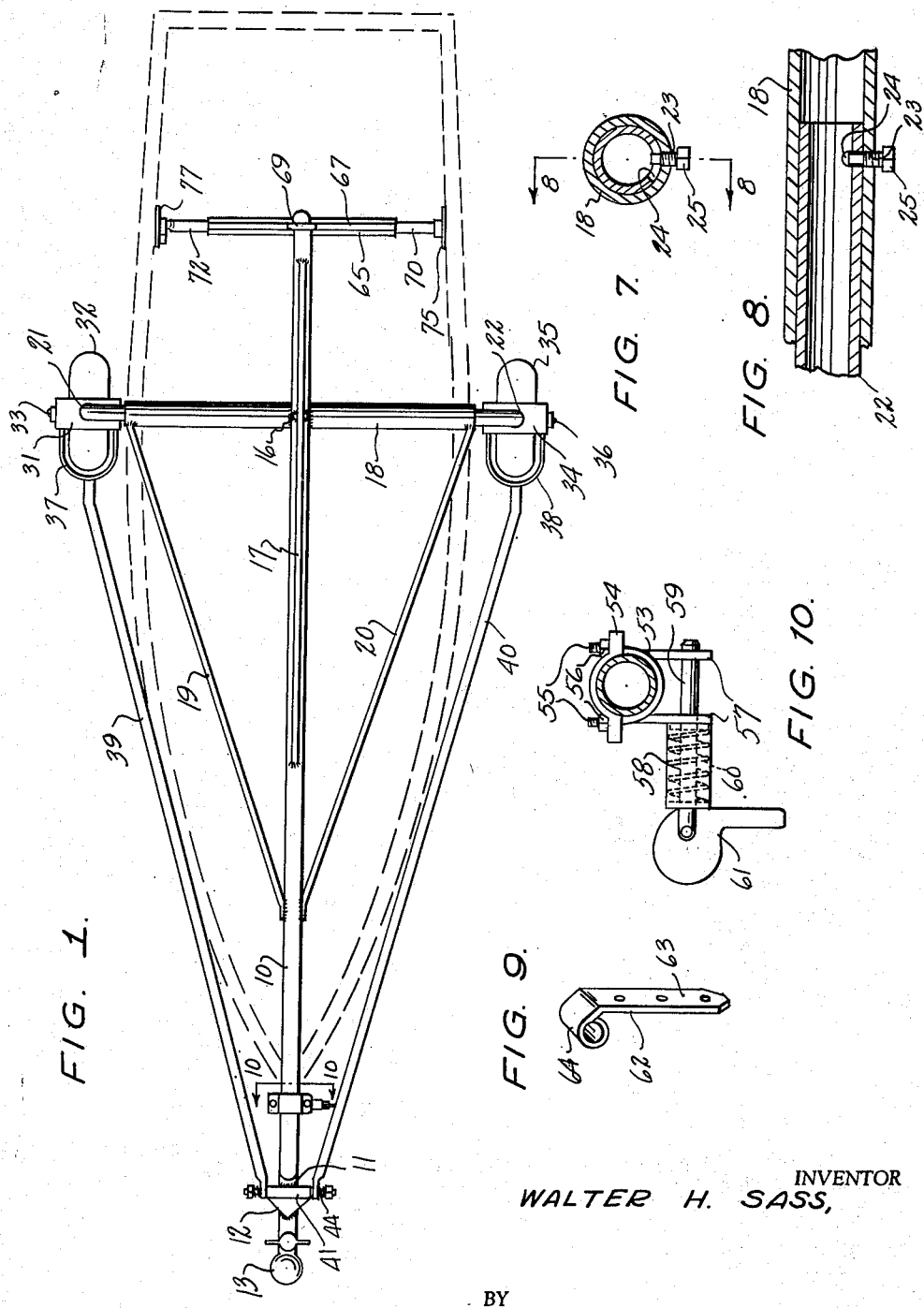
INVENTOR
WALTER H. SASS,
BY McMorrow, Berman + Davidson
ATTORNEYS.

April 7, 1953 W. H. SASS 2,634,010
BOAT SUPPORTING BRACKET
Filed Dec. 6, 1949 2 SHEETS—SHEET 2
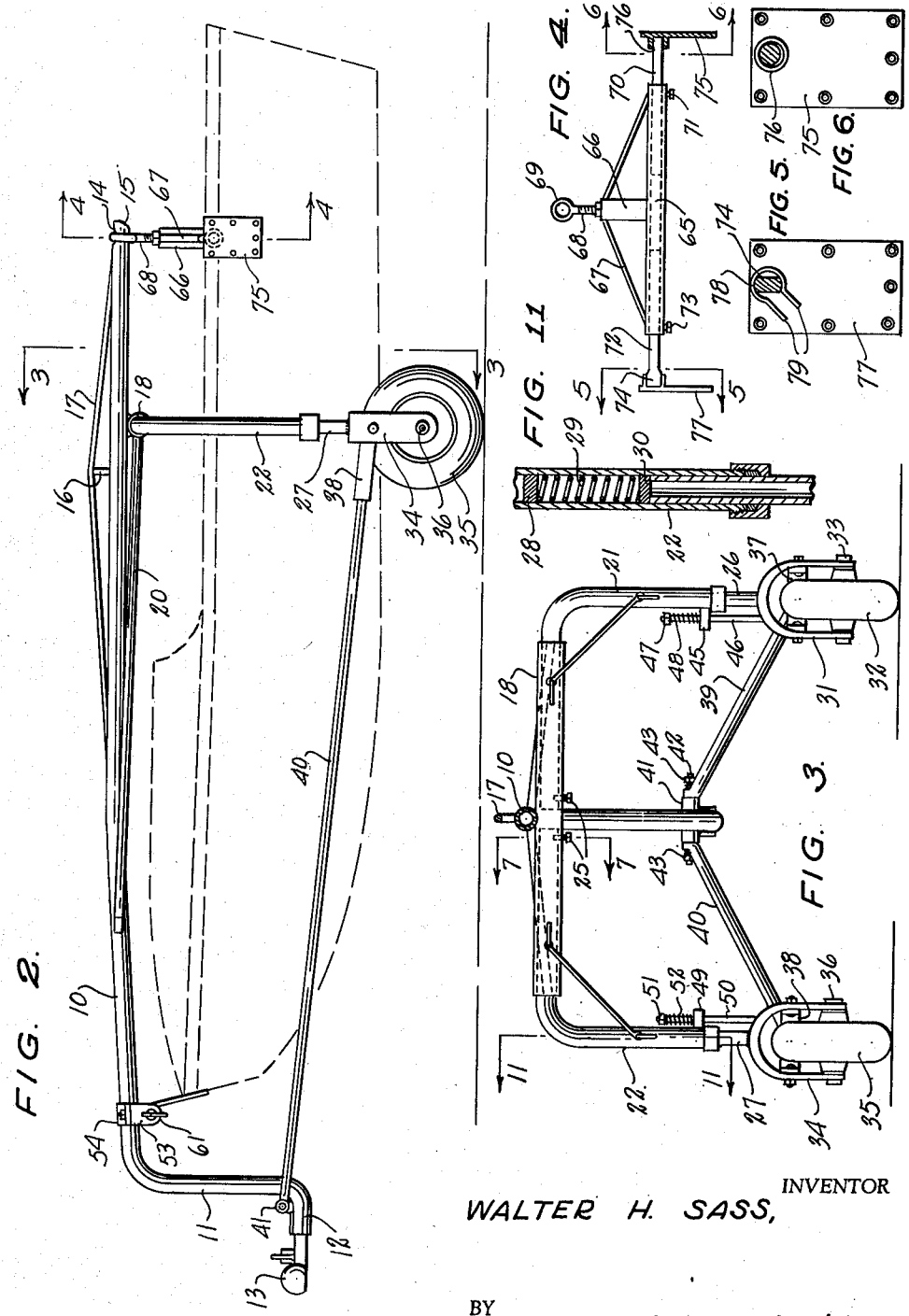
INVENTOR
WALTER H. SASS,
BY McMorrow, Berman + Davidson
ATTORNEYS Patented Apr. 7, 1953

2,634,010

UNITED STATES PATENT OFFICE 2,634,010

BOAT SUPPORTING BRACKET

Walter H. Sass, Chicago, Ill.

Application December 6, 1949, Serial No. 131,308

2 Claims. (Cl. 214—373)

This invention relates to boat trailers and more particularly to a trailer which can be used to lift and suspendingly support a boat and can be connected to an automotive vehicle, such as an automobile, for transporting the boat from place to place.

It is among the objects of the invention to provide an improved boat trailer of simplified construction which can be quickly and easily attached to a boat and to a towing vehicle and can be used as a lever to lift the boat to a position at which the boat is suspendingly supported by the trailer for transportation, which utilizes only two road wheels for supporting the boat and provides adequate resilient suspension between each wheel and the boat to protect the boat from shocks and vibrations, which is rigidly braced and reinforced and at the same time is of light weight and of the minimum size consistent with the dimensions of the boat to be transported, and which is economical to manufacture, neat and attractive in appearance, and easy to use.

Other objects and advantages will become apparent from a consideration of the following description and the appended claims in conjunction with the accompanying drawings, wherein:

Figure 1 is a top plan view of a boat trailer illustrative of the invention, the location of a boat operatively associated with the trailer being shown in broken lines;

Figure 2 is a side elevation of the boat trailer illustrated in Figure 1;

Figure 3 is a transverse cross section on the line 3—3 of Figure 2;

Figure 4 is a cross section on the line 4—4 of Figure 2;

Figure 5 is a cross section on a somewhat enlarged scale on the line 5—5 of Figure 4;

Figure 6 is a cross section on a somewhat enlarged scale on the line 6—6 of Figure 4;

Figure 7 is a transverse cross section on an enlarged scale on the line 7—7 of Figure 3;

Figure 8 is a longitudinal cross section on the line 8—8 of Figure 7;

Figure 9 is a perspective view of a bracket attachable to a boat for connecting the bow end of the boat to the trailer;

Figure 10 is a cross section on an enlarged scale on the line 10—10 of Figure 1; and Figure 11 is a longitudinal cross section of a fragmentary portion of the boat trailer taken on the line 11—11 of Figure 3.

With continued reference to the drawings, the trailer has an elongated tongue 10 which is preferably of tubular cross section and is substantially straight for the greater part of its length. Near its forward end the tongue 10 is bent downwardly to provide a downwardly directed portion 11 and the lower portion of this downwardly directed portion 11 is bent forwardly, as indicated at 12.

One element 13 of some known or desired form of trailer hitch is secured to the front end of the tongue at the forwardly directed portion 12 of the downwardly extending portion 11. Near its rear end the tongue is provided in its upper side with a notch formation 14 and the rear end of the tongue is slightly rounded or tapered, as indicated at 15, for a purpose which will presently appear.

A bridge 16 is secured to the tongue intermediate the length and near the rear end of the latter and projects upwardly from the tongue and a tension rod 17 is secured at its ends to the upper side of the tongue at locations spaced from the respectively opposite sides of the bridge 16 and is carried over the bridge to reinforce the tongue and particularly to support the rear end of the latter.

A tubular quill 18 is secured substantially at its mid-length location to the under side of the tongue 10 intermediate the length of the tongue and adjacent the bridge 16, that is, between the mid-length location of the tongue and the rear end of the latter and this quill is disposed substantially perpendicular to the tongue with its center line perpendicular to a plane which includes the center line of the tongue including the downwardly directed portion 11 of the latter.

Two brace rods 19 and 20 are disposed at respectively opposite sides of the tongue and are connected at their front ends to the tongue at a location on the latter between its mid-length location and the front end thereof and are connected at their rear ends to the quill 18 at or near the respectively opposite ends of the quill. Two tubular struts 21 and 22 of L-shaped formation are disposed at the respectively opposite ends of the quill 18 and each strut has one leg telescopically received in the quill and extending to a location slightly spaced from the mid-length location of the latter and its other leg depending from the corresponding end of the quill. The legs of the struts 21 and 22 received in the quill are rotatable therein and the amount of rotation of the strut legs relative to the quill is limited by means particularly illustrated in Figures 7 and 8 wherein the quill is provided with two screw threaded apertures 23 disposed at respectively opposite sides of the mid-length location of the quill and spaced substantially equally from such location. Each strut leg received in the quill is provided with a circumferentially elongated aperture 24 registering with a corresponding screw threaded aperture in the quill and set screws 25 are threaded through the apertures in the quill and extend into the elongated apertures in the strut legs to limit rotation of the strut legs relative to the quill to the length of the elongated apertures 24 in the strut legs.

An elongated plunger 26, preferably of tubular formation, is slidably received in the depending leg of the strut 21 and projects downwardly from the lower end of the strut while a similar plunger 27 is slidably received in the depending leg of the structure 22 and projects downwardly from the lower end of this strut. As illustrated in Figure 11, a spring abutment 28 is secured in the depending leg of each strut near the upper end of such leg and a coiled compression spring 29 is disposed between this abutment and the upper end of the corresponding plunger, such as the plunger 27 slidably received in the depending leg of the strut 22. Preferably a pad or washer 30 is placed on the upper end of the tubular plunger to provide a suitable abutment for the lower end of the corresponding compression spring.

A wheel fork 31 of flat metal stock and of inverted, U-shaped formation is secured at its closed end to the lower end of the plunger 26 and a pneumatic tired wheel 32 is journaled in this fork by an axle 33 which extends through suitable openings provided in the legs of the fork near the lower or open end of the latter. A similar fork 34 is secured at its closed end to the bottom end of the plunger 27 and a wheel 35, similar to the wheel 32 is journaled in the fork 34 by an axle 36.

The compression springs 29 provide independent resilient suspensions between the wheels 32 and 35 and the tongue 10 of the trailer so that either wheel may move upwardly, upon encountering an obstacle, against the resilient force of the associated compression spring.

A U-shaped guard 37 is secured at its open end to the legs of the fork 31 and extends forwardly from the fork 31 while a similar U-shaped guard 38 is secured at its open end to the legs of the fork 34 and extends forwardly from this fork. Two elongated rods 39 and 40 are disposed at respectively opposite sides of the tongue 10 and the rod 39 is connected at its rear end to the guard 37 at the closed end of the latter while the rod 40 is connected at its rear end to the closed end of the guard 38, these rods being flattened at their forward ends and each provided with an aperture extending through the flattened portion thereof.

A short sleeve 41 is secured on the tongue at the juncture of the downwardly extending portion 11 and the forwardly projecting portion 12 of the tongue and extends transversely of the tongue at this location. A screw threaded pin 42 extends through the sleeve 41 and is received at its respectively opposite ends in the apertures provided in the rods 39 and 40 at the forward ends of the latter to pivotally connect the forward ends of these rods to the tongue. Nuts 43 are threaded onto the pin 42 at the outer side of the rods 39 and 40 and compression springs 44 disposed between these nuts and the flattened end portions of the rods hold the rods in contact with the adjacent ends of the sleeve 41.

With this arrangement, if either one of the wheels and wheel fork assemblies moves up or down swinging the rear end of the corresponding rod 39 or 40, the slight rotational movement of the leg of the corresponding strut received in the quill 18 relative to the quill will permit the wheel to swing forwardly or rearwardly to compensate for the arcuate movement of the rear end of the rod.

An apertured lug 45 is secured to the depending leg of the strut 21 near the lower end of the latter and projects inwardly of the depending strut leg and a rod 46 is secured at its lower end to the fork 31 at the closed end of the latter and projects upwardly through the lug 45. A nut 47 is secured on the upper end of the rod 46 and a compression spring 48 surrounds the rod between the lug 45 and the nut 47 to oppose a damping action to the operation of the associated compression spring 29 in the strut 21. A similar apertured lug 49 projects inwardly from the lower end of the depending leg of the strut 22 and a rod 50 is secured at its lower end to the closed end of the fork 34 and projects upwardly through the lug 49. A nut 51 is secured on the upper end of the rod 50 and a compression spring 52 surrounds the rod 50 between the nut 51 and the lug 49 to oppose a damping action to the operation of the compression spring in the depending leg of the strut 22.

A bracket 53 and a complementary saddle 54 surround the tongue 10 near the downwardly extending portion 11 of the tongue and are secured together in tongue clamping relationship by screw threaded studs 55 which extend from the bracket through apertures in the saddle 54 at respectively opposite sides of the tongue and nuts 56 threaded onto these studs and bearing against the upper side of the saddle. The bracket 53 has two spaced apart, depending legs 57 provided near their lower ends with mutually registering apertures and a hollow housing 58 is secured to the outer side of one of these legs and projects outwardly therefrom. A locking pin 59 extends through the housing and is resiliently urged to a position in which it also extends through the apertures in the legs 57 by a compression spring 60 in the housing. A cam lever 61 secured to the pin 59 and bearing against the outer end of the housing 58 is operative to withdraw the pin from the space between the two legs 57 of the bracket.

A strap 62 has an elongated apertured portion 63 attachable to the stem of a boat at the bow end of the latter and has at the upper end of the portion 63 a cylindrical eye 64 which is receivable between the legs 57 of the bracket 53. With the strap 61 attached to a boat, when the eye 64 is positioned between the legs 57 and the pin 59 projected through this eye and through the apertures in the legs 57, the corresponding end of the boat is firmly connected to the tongue of the trailer.

An assembly for attaching the boat to the rear end of the tongue 10 is particularly illustrated in Figures 1, 4, 5 and 6 and comprises a tubular shaft or quill 65, a bridge 66 upstanding from the midlength location of the tubular shaft 65 and a tension rod 67 secured at its ends to the shaft 65 at the respectively opposite ends of the latter and carried over the bridge 66.

An eye bolt 68 is threaded into the upper end of the bridge 66 and has at its upper end a circular eye 69 of a size to slip over the rear end of the tongue 10 and seat in the notch formation 14 in the tongue. A rod 70, preferably of circular cross section, is received in one end of the tubular shaft 65 and projects outwardly from such one end of the shaft. This rod is positioned longitudinally of the shaft by a set screw 71 threaded through an aperture in the tubular shaft and engaging at its inner end the rod 70. A similar rod 72 is slidably received in the tubular shaft 65 at its opposite end and held in longitudinally adjusted position relative to the shaft by a set screw 73. This rod 72 has on its outer end a widened and flattened portion 74 the purpose of which will presently appear. A flat plate 75, preferably of rectangular shape and having apertures therethrough is attached to the inner side of the boat at one side thereof between the mid-length location of the boat and the stern or rear end of the latter and a boss 76 is secured at one end to this plate and projects inwardly of the boat when the plate is properly attached to the boat. The boss 76 receives the outer end of the rod 70, as is clearly illustrated in Figure 4, to connect this rod to the boat.

A similar flat plate 77 is attachable to the inner side of the boat at the opposite side of the latter and in transverse alignment with the plate 75 and a boss 78 is connected at one end to the plate 77 and projects therefrom inwardly of the boat when the plate 77 is properly attached to the boat. The boss 78 has at one side an opening from which two spaced apart, substantially parallel legs 79 extend downwardly and forwardly of the boat at an angle of approximately 45° to the horizontal. The distance between the legs 79 is less than the internal diameter of the boss 78 and is substantially the same as the thickness of the flattened end portion 74 of the rod 72. With this arrangement, in order to attach the boat to the rear end of the tongue 10 the outer end of the rod 70 is first inserted in the boss 76, the bridge 66 and eye bolt 68 are then tilted rearwardly and upwardly to an angle of approximately 45° to the horizontal and the flattened end portion 74 of the rod 72 is moved through the slot between the legs 79 and into the boss 78. The bridge and ring bolt are then brought to a substantially vertical position and the trailer is then moved over the boat with the wheels 32 and 35 at respectively opposite sides of the boat until the rear end of the tongue 10 is substantially over the ring bolt 68. The front end of the trailer is then lifted until the rear end of the tongue is brought down to the eye of the ring bolt and the rear end of the tongue is then inserted through the eye of the ring bolt and the eye seated in the notch formation 14. The front end of the trailer tongue is then pulled downwardly lifting the portion of the boat to which the plates 75 and 77 are attached. The bow end of the boat is then lifted until the eye 64 of the strap 62 registers with the apertures in the legs 57 of the bracket 53 and the cam lever 61 is then moved to release the pin 57 so that the spring 60 will force the pin through the legs of the bracket and through the eye of the strap thereby attaching the bow end of the boat to the tongue. The bow end of the boat may now be released and the boat will be firmly supported from the trailer in position for transportation. The hitch element 13 is then connected to a complementary hitch element carried on the towing vehicle and the boat trailer with the boat suspended therefrom will then follow the towing vehicle.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed as new is:

1. In combination with a boat having spaced apart sides, means for suspending said boat from a boat trailer comprising plates secured one to each side of said boat intermediate the length and near the upper edges of said sides, said plates being disposed at the inner sides of said boat sides and aligned transversely of the boat, hollow bosses mounted one on each of said plates and projecting from the sides of said plates remote from the corresponding sides of said boat, a tubular quill disposed between said bosses transversely of said boat, rods slidably mounted one in each end of said quill and each projecting from said quill and having its outer end engaged in the adjacent boss, means carried by said quill and engaging said rods holding the latter in selected positions of longitudinal adjustment relative to the former, and a ring secured to said quill adjacent the mid length location of the latter and adapted to receive a boat supporting portion of a boat trailer.

2. In combination with a boat having spaced apart sides, means for suspending said boat from a boat trailer comprising plates secured one to each side of said boat intermediate the length and near the upper edges of said sides, said plates being disposed at the inner sides of said boat sides and aligned transversely of the boat, hollow bosses mounted one on each of said plates and projecting from the sides of said plates remote from the corresponding sides of said boat, a tubular quill disposed between said bosses transversely of said boat, rods slidably mounted one in each end of said quill and each projecting from said quill and having its outer end engaged in the adjacent boss, means carried by said quill and engaging said rods holding the latter in selected positions of longitudinal adjustment relative to the former, a bridge mounted on said quill substantially at the mid length location of the latter and projecting outwardly from said quill, tension rods secured each at one end to said bridge at the end of the latter remote from said quill and extending from said bridge to the respectively opposite ends of said quill with their ends remote from said bridge secured to said quill at the respectively opposite ends of the latter, and a ring secured to said bridge at the end of the latter remote from said quill and projecting outwardly from said bridge to receive a boat supporting portion of a boat trailer.

WALTER H. SASS.

REFERENCES CITED

The following references are of record in the file of this patent:

UNITED STATES PATENTS

| Number | Name | Date |
| --- | --- | --- |
| 859,825 | Mann | July 9, 1907 |
| 895,249 | Garlock | Aug. 4, 1908 |
| 1,225,611 | Gatlin | May 8, 1917 |
| 1,299,556 | Crecelius | Apr. 8, 1919 |
| 1,752,683 | Meagher | Apr. 1, 1930 |
| 1,763,034 | Bunker | June 10, 1930 |
| 2,260,676 | Lafaye | Oct. 28, 1941 |
| 2,444,231 | Sanford | June 29, 1948 |
| 2,451,236 | Oeth | Oct. 12, 1948 |
| 2,507,612 | Rankin | May 16, 1950 |
| 2,520,144 | Holsclaw | Aug. 29, 1950 |
| 2,525,715 | Oeth | Oct. 10, 1950 |
| 2,529,849 | Oeth | Nov. 14, 1950 |